US012627995B2

(12) United States Patent
Hannan

(10) Patent No.: US 12,627,995 B2
(45) Date of Patent: May 12, 2026

(54) SYSTEMS AND METHODS FOR EFFICIENTLY REALLOCATING A PAL CHANNEL IN WHICH A PAL USER'S RADIO TRANSMITS

(71) Applicant: Outdoor Wireless Networks LLC, Claremont, NC (US)

(72) Inventor: Ariful Hannan, Sterling, VA (US)

(73) Assignee: Outdoor Wireless Networks LLC, Richardson, TX (US)

( * ) Notice: Subject to any disclaimer, the term of this patent is extended or adjusted under 35 U.S.C. 154(b) by 446 days.

(21) Appl. No.: 18/149,584

(22) Filed: Jan. 3, 2023

(65) Prior Publication Data

US 2023/0247440 A1 Aug. 3, 2023

Related U.S. Application Data

(60) Provisional application No. 63/305,376, filed on Feb. 1, 2022.

(51) Int. Cl.
*H04W 16/14* (2009.01)
*H04W 72/0453* (2023.01)

(52) U.S. Cl.
CPC ....... *H04W 16/14* (2013.01); *H04W 72/0453* (2013.01)

(58) Field of Classification Search
CPC .......................... H04W 16/14; H04W 72/0453
See application file for complete search history.

(56) References Cited

U.S. PATENT DOCUMENTS

| | | | | |
|---|---|---|---|---|
| 2009/0010309 A1* | 1/2009 | Bernett | ................. | H04W 16/14 |
| | | | | 375/135 |
| 2016/0330743 A1* | 11/2016 | Das | ........................ | H04W 12/06 |
| 2023/0337324 A1* | 10/2023 | Hafeez | ................. | H04W 76/22 |
| 2024/0215002 A1* | 6/2024 | Sevindik | .............. | H04W 72/51 |

OTHER PUBLICATIONS

Wireless Innovation Forum, "Operations for Citizens Broadband Radio Service (SBRS): Priority Access License (PAL) Database Technical Specification", Document WINNF-TS-0245, Version V1.2.0, Mar. 3, 2021, pp. Cover through 8.
Wireless Innovation Forum, "Requirements for Commercial Operation in the U.S. 3550-3700 MHz Citizens Broadband Radio Service Band", Document WINNF-TS-0112, Version V1.9.1, Mar. 11, 2020, pp. Cover through 76.

* cited by examiner

*Primary Examiner* — Thomas R Cairns
*Assistant Examiner* — Raenita Ann Fenner
(74) *Attorney, Agent, or Firm* — Fogg & Powers LLC

(57) ABSTRACT

Techniques are provided for more reliably selecting an available secondary channel for a PAL user when the PAL user must relinquish its primary channel to an incumbent user for use in a geographic region. An indication is received that the incumbent user is utilizing or will utilize at least one PAL channel. It is determined whether the at least one PAL channel is utilized by at least one PAL user. Upon determining that the at least one PAL channel is utilized by at least one PAL user, then each PAL channel, used by the PAL user and for which the indication has been received, is shifted higher or lower in frequency to an available PAL channel.

21 Claims, 3 Drawing Sheets

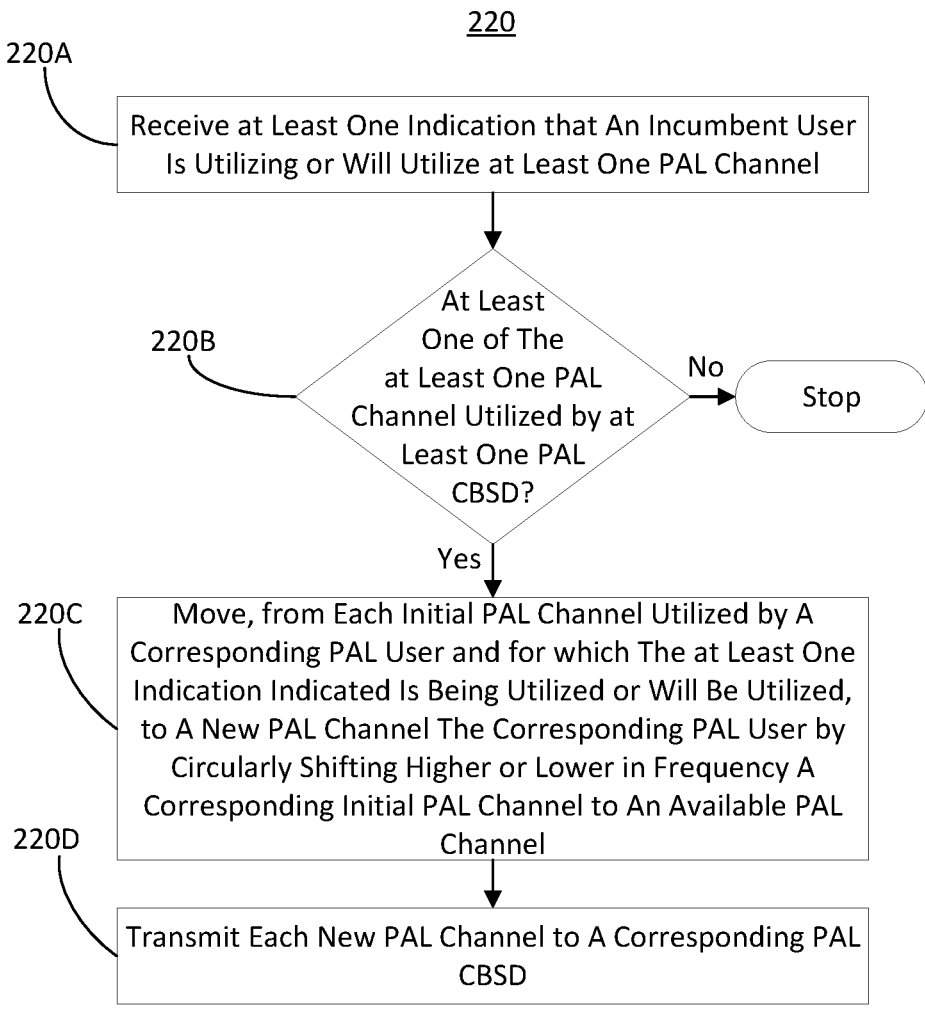

220

220A

Receive at Least One Indication that An Incumbent User Is Utilizing or Will Utilize at Least One PAL Channel

220B

At Least One of The at Least One PAL Channel Utilized by at Least One PAL CBSD?

No → Stop

Yes

220C

Move, from Each Initial PAL Channel Utilized by A Corresponding PAL User and for which The at Least One Indication Indicated Is Being Utilized or Will Be Utilized, to A New PAL Channel The Corresponding PAL User by Circularly Shifting Higher or Lower in Frequency A Corresponding Initial PAL Channel to An Available PAL Channel

220D

Transmit Each New PAL Channel to A Corresponding PAL CBSD

Figure 2

SYSTEMS AND METHODS FOR EFFICIENTLY REALLOCATING A PAL CHANNEL IN WHICH A PAL USER'S RADIO TRANSMITS

CROSS-REFERENCE TO RELATED APPLICATIONS

The present application claims benefit of U.S. Patent Application Ser. No. 63/305,376, filed Feb. 1, 2021; the entire contents of the aforementioned patent application are incorporated herein by reference as if set forth in its entirety.

BACKGROUND

A citizens broadband radio service (CBRS) includes incumbent users of shared spectrum and secondary users of shared frequency spectrum. Shared frequency spectrum, or shared spectrum, means frequency spectrum in which at least one incumbent user and at least one secondary user are permitted to transmit.

An incumbent user may also be referred to as a primary user or an incumbent. Incumbent users have priority access to transmit in the spectrum shared with the secondary users. An incumbent user may be, for example, naval radar. Such naval radar may intermittently operate in a dynamic protection area (DPA).[1] Alternatively, the incumbent user may be a new fixed satellite service (FSS); typically, an FSS is a static service upon commencement of transmissions, and a DPA is inapplicable to an FSS.

[1] A DPA is a geographic region in which protection of an incumbent user only occurs when the incumbent user transmits in the geographic region. Optionally, a DPA is a portion of a body of water and the incumbent user is a ship using radar transmitting in the shared spectrum.

When an incumbent user commences transmitting in certain frequency spectrum of the shared spectrum, aggregate interference at the incumbent user or in a region in which the incumbent user may be located must be maintained below an interference threshold. As a result, a secondary user authorized to transmit in the certain frequency spectrum may have to diminish its maximum transmit power or cease transmitting in the certain frequency spectrum. If required to cease transmitting, the secondary user may be permitted to transmit in other frequency spectrum in the shared spectrum not used by the incumbent user.

Such secondary users may use citizens broadband radio service device(s) (CBSD(s)). A CBSD is a radio including a transmitter coupled to an antenna. A CBRS system may include at least one spectrum access system (SAS). Each SAS regulates the transmissions of certain CBSD(s) in the shared spectrum under the SAS's control, e.g., whether each CBSD of a SAS can transmit in the shared spectrum, and if so, then at what frequency spectrum and power level, to ensure that aggregate interference at incumbent user(s), geographic region(s), and/or other CBSDs is within appropriate interference limits.

In CBRS, a secondary user can either be a PAL user and/or a GAA user. Each CBSD can operate as Priority Access License (PAL) CBSD if the owner of the CBSD owns a PAL license in the geographic area where CBSD is deployed. For CBRS, each PAL license is granted access to a PAL channel (which for CBRS has a 10 MHz bandwidth) in PAL frequency spectrum (which for CBRS is the first 100 MHz of CBRS band). A user which does not have a PAL license may be granted access to transmit in a PAL channel which is not used by a PAL user or an incumbent user. SAS(s) must regulate interference from GAA CBSD(s) not only at each PAL CBSD transmitting on a PAL channel but also a region around one or more PAL CBSD transmitting on the PAL channel. A PAL user means a user who has a license to operate in PAL frequency spectrum in a geographic region (e.g., a county). A PAL CBSD means a CBSD operated by a PAL user.

The region around one or more PAL CBSDs using PAL channels is referred to as a PAL protection area (PPA).[2] For CBRS, the PPA is defined by a contour around each PAL CBSD which the PPA protects from interference and in which aggregate interference from GAA CBSDs and PAL CBSDs (outside of the PPA) in each PAL channel of the PAL frequency spectrum must be less than −80 dBm/10 MHz. The PPA may be formed by a union of such contours for nearby PAL CBSDs. The PPA may be defined with protection points which may be equally spaced from one another. The neighborhood of a protection point means a geographic region centered around the protection point. Optionally, the neighborhood is a circle having a radius of 40 km.

[2] Analogous to a PPA, interference must also be regulated within an area known as a grandfathered wireless protection zone (GWPZ). A GWPZ is a geographic area and frequency range in which grandfathered wireless licensees receive protection from CBSD transmission.

PAL CBSDs operate in certain portion of the shared spectrum, e.g., the lower one hundred megahertz of the CBRS band. The portion of the shared spectrum may be referred to as the PAL shared spectrum. The PAL shared spectrum is divided into a finite number of channels, i.e., blocks of frequency spectrum which comprise the PAL shared spectrum. Channel means a frequency spectrum with a center frequency and a bandwidth; thus, the channel has an upper frequency and a lower frequency. For CBRS, the PAL shared spectrum comprises ten channels each of which has a bandwidth of 10 MHz. For CBRS, up to seven PAL channels, in each geographic region (e.g., each county) have been licensed, through auction, by the U.S. Federal Communications Commission to PAL users. For CBRS, each PAL user licensed in a geographic region was subsequently assigned a static physical frequency spectrum (or channel) which is referred here in the application as a primary PAL channel. Thus, primary PAL channel means a physical channel to which a PAL user is assigned to use, except when the PAL user is required to vacate the physical channel.

For CBRS, only a first subset of, e.g., five to seven, PAL channels in the PAL share spectrum are licensed in a geographic region, e.g., a county, to at least one entity, e.g., at least one network operator. For CBRS, a second subset of, e.g., five to three, PAL channels are not licensed in the geographic region; thus, for CBRS, at least 30 MHz of PAL frequency spectrum is unassigned to PAL users. The set subset of PAL channels which are not licensed may be used by PAL user(s) whose use of their primary channel(s) are suspended when the primary channels are used by incumbent users. When use of their primary channels is suspended, the corresponding PAL users may be instructed, e.g., by the SAS, to change their transmit frequency from the primary channel to an alternative or secondary channel.

Requirements for Commercial Operation in the U.S. 3550-3700 MHz Citizens Broadband Radio Service Band, WInnForum Standard Document WINNF-TS-0112, version V. 1.9.1, dated Mar. 11, 2020 ("WINNF-TS-0112") specifies that a PAL channel may be temporarily reassigned. Operations for Citizens Broadband Radio Service (CBRS): Priority Access License (PAL) Database Technical Specification, WInnForum Standard Document WINNF-TS-0245, version V1.2.0, dated Mar. 3, 2021 ("WINNF-TS-0245") describes that the primary channel and the secondary channel of a PAL user may be obtained from a PAL database. WINNF-TS- 0112 and WINNF-TS-0245 are each incorporated herein by reference in their entirety. Thus, the secondary channel of a PAL user must be predetermined. However, even WINNF-TS-0245 recognizes that the secondary channel may not be available. For example, the predetermined secondary channel may also be utilized by an incumbent user and thus may not be available. The WInnForum specifications provide no guidance how to reliably select an available secondary channel.

SUMMARY OF THE INVENTION

A method is provided which is performed to determine a new Priority Access License (PAL) channel for a PAL radio configured to use a primary PAL channel. The method comprises: receiving at least one indication that an incumbent user is utilizing or will utilize at least one PAL channel in PAL frequency spectrum; determining whether at least one of the at least one PAL channel is utilized by at least one PAL radio which must vacate the at least one of the at least one PAL channel because of use by the incumbent user, wherein each PAL user operates at least one PAL radio; determining that the at least one of the at least one PAL channel is utilized by at least one PAL radio which must vacate the at least one of the at least one PAL channel because of the incumbent user use, then moving, from each primary PAL channel utilized by a corresponding PAL user and for which the at least one indication indicated is being utilized or will be utilized by the incumbent user, the corresponding PAL user to a new PAL channel by circularly shifting higher or lower in frequency in the PAL frequency spectrum a corresponding primary PAL channel to an available PAL channel, wherein the available PAL channel means a PAL channel (a) at least one of: (i) which is not licensed in a corresponding geographic region to a PAL user and (ii) in which the PAL user is licensed to use in the corresponding geographic region and in which a CBSD of the PAL user can be authorized to transmit in the PAL channel (e.g., by a SAS) but in which the CBSD is not authorized to transmit on the PAL channel, and (b) which the at least one indication did not indicate was being utilized or will be utilized by the incumbent user, where the incumbent user, or a dynamic protection area in which the incumbent user operates or would operate, has a neighborhood which geographically encompasses a geographic location of a PAL CBSD in the corresponding geographic region and operated by the PAL user, wherein the primary PAL channel means a PAL channel assigned to a PAL user for which the at least one indication indicated was being utilized or will be utilized by the incumbent user, and wherein circular shifting higher or lower in the PAL frequency spectrum means upon reaching an upper edge or a lower edge of the PAL frequency spectrum, then continue shifting from an opposite edge; and transmitting each new PAL channel to a corresponding PAL radio configured to change its PAL channel, in which the corresponding PAL radio transmits, to a corresponding new PAL channel.

A non-transitory computer readable medium is provided and stores a program causing at least one processor of a spectrum access system (SAS) to execute a process to determine a new Priority Access License (PAL) channel for a PAL radio configured to use a primary PAL channel. The process comprises: receiving at least one indication that an incumbent user is utilizing or will utilize at least one PAL channel in PAL frequency spectrum; determining whether at least one of the at least one PAL channel is utilized by at least one PAL radio which must vacate the at least one of the at least one PAL channel because of use by the incumbent user, wherein each PAL user operates at least one PAL radio; determining that the at least one of the at least one PAL channel is utilized by at least one PAL radio which must vacate the at least one of the at least one PAL channel because of the incumbent user use, then moving, from each primary PAL channel utilized by a corresponding PAL user and for which the at least one indication indicated is being utilized or will be utilized by the incumbent user, the corresponding PAL user to a new PAL channel by circularly shifting higher or lower in frequency in the PAL frequency spectrum a corresponding primary PAL channel to an available PAL channel, wherein the available PAL channel means a PAL channel (a) at least one of: (i) which is not licensed in a corresponding geographic region to a PAL user and (ii) in which the PAL user is licensed to use in the corresponding geographic region and in which a CBSD of the PAL user can be authorized to transmit in the PAL channel (e.g., by a SAS) but in which the CBSD is not authorized to transmit on the PAL channel, and (b) which the at least one indication did not indicate was being utilized or will be utilized by the incumbent user, where the incumbent user, or a dynamic protection area in which the incumbent user operates or would operate, has a neighborhood which geographically encompasses a geographic location of a PAL CBSD in the corresponding geographic region and operated by the PAL user, wherein the primary PAL channel means a PAL channel assigned to a PAL user for which the at least one indication indicated was being utilized or will be utilized by the incumbent user, and wherein circular shifting higher or lower in the PAL frequency spectrum means upon reaching an upper edge or a lower edge of the PAL frequency spectrum, then continue shifting from an opposite edge; and transmitting each new PAL channel to a corresponding PAL radio configured to change its PAL channel, in which the corresponding PAL radio transmits, to a corresponding new PAL channel.

A spectrum access system (SAS) is provided and is configured to determine a new Priority Access License (PAL) channel for a PAL radio configured to use a primary PAL channel. The SAS comprises processing circuitry configured to: receive at least one indication that an incumbent user is utilizing or will utilize at least one PAL channel in PAL frequency spectrum; determine whether at least one of the at least one PAL channel is utilized by at least one PAL radio which must vacate the at least one of the at least one PAL channel because of use by the incumbent user, wherein each PAL user operates at least one PAL radio; determine that the at least one of the at least one PAL channel is utilized by at least one PAL radio which must vacate the at least one of the at least one PAL channel because of the incumbent user use, then move, from each primary PAL channel utilized by a corresponding PAL user and for which the at least one indication indicated is being utilized or will be utilized by the incumbent user, the corresponding PAL user to a new PAL channel by circularly shifting higher or lower in frequency in the PAL frequency spectrum a corresponding primary PAL channel to an available PAL channel, wherein the available PAL channel means a PAL channel (a) at least one of: (i) which is not licensed in a corresponding geographic region to a PAL user and (ii) in which the PAL user is licensed to use in the corresponding geographic region and in which a CBSD of the PAL user can be authorized to transmit in the PAL channel (e.g., by a SAS) but in which the CBSD is not authorized to transmit on the PAL channel, and (b) which the at least one indication did not indicate was being utilized or will be utilized by the incumbent user, where the incumbent user, or a dynamic protection area in which the incumbent user operates or would operate, has a neighborhood which geographically encompasses a geographic location of a PAL CBSD in the corresponding geographic region and operated by the PAL user, wherein the primary PAL channel means a PAL channel assigned to a PAL user for which the at least one indication indicated was being utilized or will be utilized by the incumbent user, and wherein circular shifting higher or lower in the PAL frequency spectrum means upon reaching an upper edge or a lower edge of the PAL frequency spectrum, then continue shifting from an opposite edge; and transmit each new PAL channel to a corresponding PAL radio configured to change its PAL channel, in which the corresponding PAL radio transmits, to a corresponding new PAL channel.

BRIEF DESCRIPTION OF THE DRAWINGS

Comprehension of embodiments of the invention is facilitated by reading the following detailed description in conjunction with the annexed drawings, in which:

FIG. 2 illustrates a flow diagram of one embodiment of a method for more reliably selecting an available secondary channel for a PAL user when the PAL user must relinquish its primary channel.

DETAILED DESCRIPTION

Figure 1:
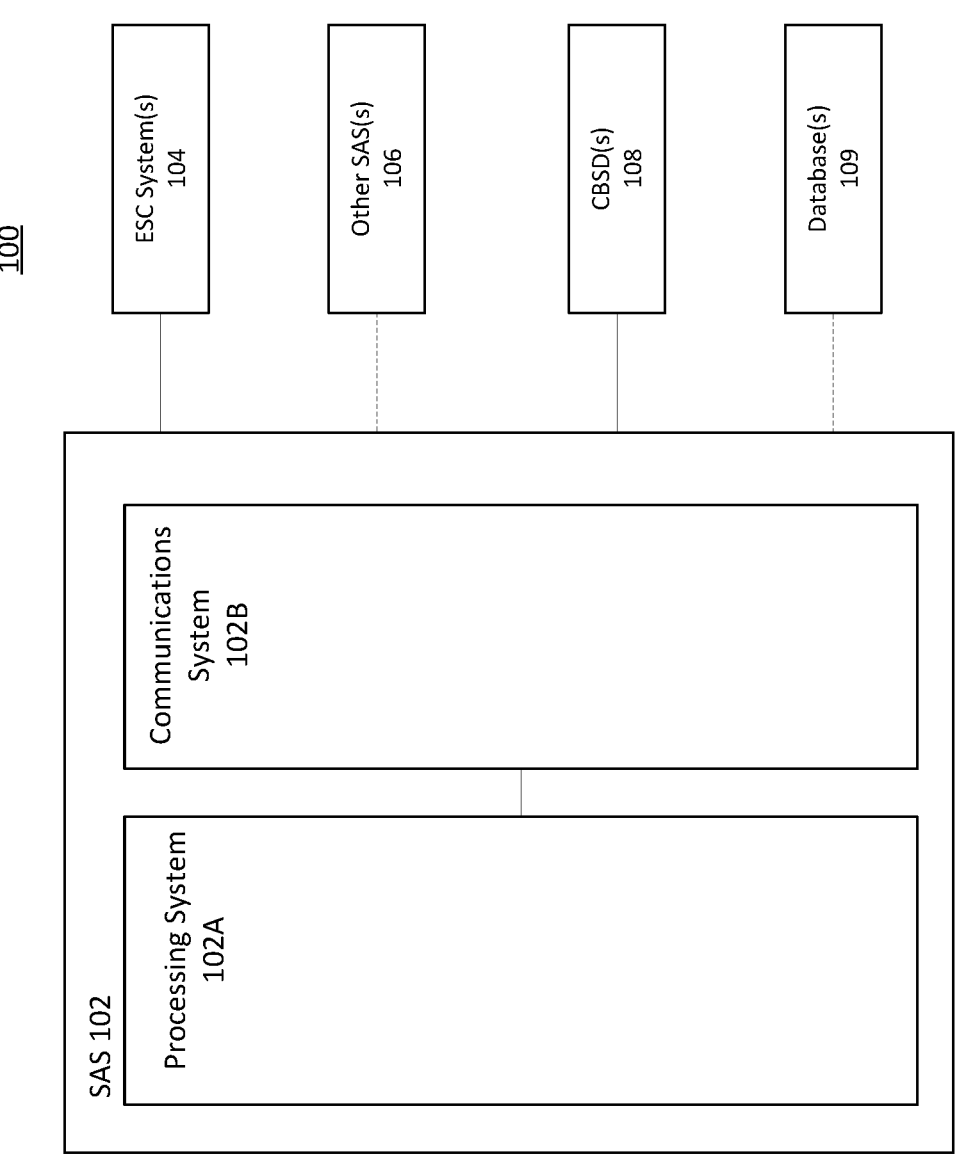
FIG. 1 illustrates a block diagram of one embodiment of a shared spectrum system 100 configured to reliably allocate a PAL channel used by a PAL user.

Embodiments of the invention implement techniques for more reliably selecting an available secondary channel for a PAL user when the PAL user must relinquish its primary channel, e.g., to an incumbent user, for use in a geographic region. Embodiments of the invention do so by receiving an indication that an incumbent user is utilizing or will utilize at least one PAL channel. Each PAL channel is in the PAL frequency spectrum ("PAL spectrum" or "PAL band"). PAL frequency spectrum means a frequency spectrum in which a PAL channel can exist. It is determined whether the at least one PAL channel is utilized by at least one PAL user. Upon determining that the at least one PAL channel is utilized by at least one PAL user, then circularly shifting higher or lower in frequency each PAL channel, utilized by a PAL user and for which the indication has been received, to an available PAL channel. When such techniques are implemented in all SAS(s) of a shared spectrum system, e.g., CBRS, then each SAS can use the techniques to determine independently determine the same secondary channel(s), and the aforementioned database no longer needs to store a secondary channel for each PAL.

Available PAL channel is defined elsewhere herein. Optionally, if more than one PAL channel of the at least one PAL channel is utilized by at least one PAL user, then shift each PAL channel in order from lowest center frequency to highest center frequency, or from highest center frequency to lowest center frequency. Each PAL user operates at least one CBSD which is configured to transmit on at least one PAL channel. Although embodiments of the invention are applicable to and may be exemplified in the context of CBRS for pedagogical purposes, the embodiments are applicable to other shared spectrum systems, such as for example licensed spectrum access systems or authorized access systems. Thus, for example, a CBSD may be more generally referred to as a radio. Shared spectrum (or shared frequency spectrum) means frequency spectrum utilized by: (a) incumbent user(s) (e.g., a receiver of a fixed satellite service) and/or geographic region(s) to be maintained interference free (e.g., a grandfather wireless protection zone (GWPZ) or priority access license (PAL) protection area (PPA), a geographic location of an environmental sensing capability (ESC) system receiver(s) and/or an exclusion zone) and (b) at least one of priority access licensee (PAL) CBSD(s) and GAA CBSD(s). The CBSD may be a GAA or a priority access license (PAL) CBSD. Optionally, threshold levels mentioned herein may be set by a system designer and/or a system user.

A protection point means a point representing actual and/or potential incumbent user(s) and/or geographic region(s) which are to remain free of interference (as that term is defined herein) from CBSDs.

Frequency spectrum, or each portion thereof, associated with a protection point means frequency spectrum that must be free of interference (as that term is elsewhere defined herein) at the geographic location of the protection point; optionally, such frequency spectrum corresponds to frequency spectrum protected from interference, e.g., utilized by a receiver of an incumbent user or a PAL CBSD.

Frequency spectrum means a bandwidth centered about a center frequency. Unless otherwise indicated herein, power as used herein means power or power spectral density. Power levels for a shared spectrum system, such as a CBRS, are often characterized in terms of power spectral density levels. Optionally, power or power spectral density may be a level radiated by antenna(s) electrically coupled to a transmitter of a CBSD and characterized in terms of effective isotropic radiated power (EIRP).

A CBRS system comprises general authorized access (GAA) and/or priority access license (PAL) CBSDs, and incumbent users and geographic region(s) to be maintained free of interference. The incumbent users, such as government users fixed satellite service receiver(s), have priority access, with respect to secondary users such as CBSDs, to some or all of spectrum in the shared spectrum. When satisfying interference requirements, a SAS is configured to grant the CBSDs access to the shared spectrum, including authorizing frequency spectrum (or channels) requested by CBSDs, and authorizing a corresponding requested maximum transmission power or assigning a lower than requested maximum transmission power. Maximum transmit power (or maximum transmit power level) means a maximum power level that a CBSD can transmit while ensuring that an aggregate interference level, e.g., each at protection point(s) or optionally another CBSD, remains at or below a permissible interference threshold level; such maximum transmit power may be authorized by a SAS or a system that performs interference protection analysis like the SAS. The SAS is configured to control the transmission of GAA CBSDs so that PAL CBSDs and the incumbent users are free of interference from GAA CBSDs. The GAA and PAL CBSDs are secondary users; the PAL CBSDs are secondary users because they have a lower priority than incumbent users. For example, PAL and GAA CBSDs must also protect Environmental Sensing Capability (ESC) sensors which are used to detect radar transmissions, e.g., from naval ships, in the CBRS band. The SAS is also configured to control the transmission of PAL and GAA CBSDs so that incumbent users are free of interference from PAL and GAA CBSDs.

Free of interference as used herein does not mean an absence of interference, but rather means an acceptable level of interference (i.e., a level of interference below a threshold level of interference) which may be no interference or a finite level of interference; thus, to determine if a geographic location, e.g., of an incumbent user or a geographic region to be maintained interference free, is free of interference, whether the interference level is below the acceptable level of interference (or a threshold interference) is determined. The acceptable level of interference may vary by the type of incumbent user or geographic region, frequency spectrum, and/or other indicia.

GAA CBSDs may be of two types: category A (low transmission power) and category B (high transmission power). Category A has a maximum transmission power spectral density of 30 dBm/10 MHz. Category B has a maximum transmission power spectral density of 47 dBm/ 10 MHz.

Incumbent users of shared spectrum have first, or highest, priority to utilize the shared spectrum controlled by the SAS. Thus, incumbent users (e.g., the receivers of incumbent users' communications systems such as radios) shall be able to operate free of interference from other users, e.g., communications systems of priority access licensees and general authorized access users. Communications systems, as used herein, shall include Environmental Sensing Capability (ESC) receivers and satellite ground stations of FSSs.

In one embodiment, PAL CBSDs have second (or intermediate) priority, after incumbent users (excluding PAL users), to utilize the frequency spectrum controlled by the SAS. In another embodiment, a PAL user shall be able to operate, when incumbent users are free of interference of such a PAL user, and free of interference from other PAL CBSDs and general authorized access users. In one embodiment, an ability of a PAL CBSD to operate free of interference shall be limited temporally, geographically, and spectrally within the specifications of its license.

GAA CBSDs have third, or lowest, priority to utilize the frequency spectrum controlled by the SAS. In one embodiment, an operation of GAA CBSDs will be governed by laws, regulations, and/or rules (e.g., pertaining to CBRS). Such laws, regulations, and/or rules may be established by government(s) and/or standards bodies (e.g., Wireless Innovation Forum or WInnForum). Optionally, a GAA CBSD shall be able to transmit when incumbent user(s) and geographic region(s) to be maintained interference free are free of interference when the GAA CBSD transmits.

The invention can be subsequently described in more general terms, e.g., using the term radio rather than CBSD, and shared spectrum system rather than CBRS. However, the terms CBRS and CBSD may be subsequently used when illustrating such a system and a device, or their specifications. Thus, a CBSD may be more generally referred to as a radio. Radio means a radio whose transmission is controlled or regulated by a spectrum access system.

FIG. 1 illustrates a block diagram of one embodiment of a shared spectrum system 100 configured to reliably allocate a PAL channel used by a PAL user. Thus, the shared spectrum system 100 comprises a SAS 102 configured to more efficiently and more accurately determine maximum transmit power allocated to CBSD(s) within a neighborhood of each protection point of the PPA. Each CBSD may be operated by a general authorized access user and/or a priority access licensee.

Optionally, the SAS 102 is coupled to at least one environmental sensing capability system (ESC system(s)) 104. Optionally, the SAS 102 is coupled to at least one database (database(s)) 109, e.g., which has information about (a) incumbent user(s) and/or (b) geographic region(s) to be maintained interference free (e.g., type, interference threshold power level, location, information about neighborhood, and/or when certain incumbent user(s) and/or geographic regions(s) to be maintained interference free are scheduled to receive in the shared spectrum or to include a communications system, e.g., a radar, that will receive in the shared spectrum. One or more of the database(s) 109 may comprise terrain elevation for geographic region(s), e.g., in which CBSD(s) are located; one or more of the database(s) 109 may comprise morphology type data (e.g., rural, water, urban, and suburban) for such geographic region(s).

Optionally, the SAS 102 is coupled to at least one other SAS (other SAS(s)) 106. The other SAS(s) 106 are configured to control the transmissions of other CBSD(s) (in the same shared spectrum in which the CBSD(s) 108 transmit or in overlapping frequency spectrum) and where the other CBSD(s) are geographically proximate to the CBSD(s) 108. For example, such other CBSDs controlled by other SAS(s) 106 may include PAL and GAA users. A PAL user and/or a GAA user may be a network operator such as a mobile network operator which provides communications services to mobile communications devices, e.g., cell phones, and/or a fixed network operator which provide communications to fixed communications devices, e.g., to provide broadband services to homes and/or businesses.

The SAS 102 is configured to perform interference analysis and authorize transmission by CBSD(s) 108 in the shared spectrum. The SAS 102 is configured to determine a maximum transmission power level for a set of the CBSD(s) 108 which it has authorized to transmit in the shared spectrum.

CBSD(s) (whose transmissions are controlled by other SAS(s) 106) may generate electromagnetic energy that overlaps the geographic region and frequency spectrum of the CBSD(s) 108 controlled by SAS 102, and thus must be accounted for by the SAS 102 when the SAS 102 performs interference analysis and authorizes transmission by CBSD(s) 108 in the shared spectrum. The CBSD(s) 108 of the shared spectrum system 100 may generate electromagnetic energy that overlaps the geographic region(s) comprising CBSD(s) whose transmissions are controlled by the other SAS(s) 106, and thus must be accounted for by the other SAS(s) 106 when the other SAS(s) 106 perform interference analysis and authorize operation of PALs and GAA CBSDs (whose transmissions are controlled by the other SAS(s) 106). By coupling SASs whose CBSDs are geographically proximate to one another, each SAS can account for electromagnetic energy emitted from proximate CBSD(s) in those geographic region(s).

Each ESC system detects, and communicates to the SAS 102, the dynamic presence of signal(s), e.g., from some incumbent user(s), such as radars. Alternatively, incumbent users can inform the SAS 102 that they are operating, e.g., by transmitting a signal beacon, or communicating with the database(s) 109 which may be coupled to the SAS 102.

The SAS 102 also is also configured to control the operation (e.g., power levels and frequencies of operation) of the GAA user(s)' CBSD(s) so that the PAL CBSD(s) operate free of interference. In one embodiment, the SAS 102 includes a processing system 102A coupled to a communications system 102B. The processing system 102A controls the operation of CBSD(s) 108 that form part of the shared spectrum system 100.

The communications system 102B facilitates communications between the SAS 102 and other systems or devices, e.g., the CBSD(s) 108, the ESC system(s) 104, the database(s) 109, and/or the other SAS(s) 106. In one embodiment, the communications system 102B includes a modem, e.g., an Internet data modem, a transceiver, and/or any other communications device(s) that can facilitate communications between the aforementioned devices.

Optionally, the processing system (or processing system circuitry) 102A may be a state machine, a neural network, and/or a quantum computer. If the processing system 102A includes a state machine, then optionally the state machine may comprise processor circuitry coupled to memory circuitry.

FIG. 2 illustrates a flow diagram of one embodiment of a method 220 for more reliably selecting an available secondary channel for a PAL user when the PAL user must relinquish its primary channel, e.g., to an incumbent user, for use in a geographic region. To the extent that the methods shown in any Figures are described herein as being implemented with any of the systems illustrated herein, it is to be understood that other embodiments can be implemented in other ways. Optionally, method 220 may be implemented by a SAS 102, e.g., by the processing system 102A; method 220 is illustrated for pedagogical purpose as being implemented by a SAS 102. PAL CBSD(s) described with respect to FIGS. 2 and 3 may be one or more of the CBSD(s) 108 described elsewhere herein.

The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 220A, at least one indication, that an incumbent user is utilizing or will utilize at least one PAL channel, is received. The at least one indication means information signifying that that an incumbent user is utilizing or will utilize a corresponding PAL channel(s). Optionally, the at least one indication can be received by a spectrum access system when at least one of: (a) an incumbent user, whose presence and transmissions in a geographic region are intermittent, will begin or has begun transmitting and (b) an incumbent user, whose presence in the geographic region or another geographic region is not intermittent, will begin or has begun transmitting. Optionally, the at least one indication can be received from at least one of the ESC system(s) 104 and/or from at least one of the database(s) 109. Optionally, the at least one indication may be received by the SAS 102. Optionally, such at least one indication may be received by the SAS 102 from: (a) at least one of the ESC system(s) 104 upon the at least one of the ESC system(s) 104 detecting naval radar transmitting in PAL frequency spectrum of the shared spectrum in corresponding DPA(s); and/or at least one of the database(s) 109 when the SAS is performing Coordinated Periodic Activities among SASs (CPAS), e.g., indicating commencement of transmission of a new FSS.

In block 220B, determining whether at least one of the at least one PAL channel (for which the at least one indication is received) is utilized by at least one PAL CBSD which must vacate the at least one of the at least one PAL channel because of the incumbent use. Optionally, pursuant to WINNF-TS-0112, a PAL CBSD on a predetermined move list must vacate its primary PAL channel when is geographically proximate to a DPA and an environmental sensing capability system detects that an incumbent user is transmitting in the DPA. Optionally, a SAS may receive information that another type of incumbent user, e.g., a fixed satellite service, has begun or will begin transmission which would require a PAL CBSD to vacate its primary PAL channel so that aggregate interference at the other type of incumbent user is within an acceptable threshold level. Optionally, block 220B further comprises determining the number of PAL users utilizing each PAL channel for which the at least one indication has been received.

If it is determined that at least one PAL user utilizes the at least one PAL channel (for which the at least one indication is received) and must vacate the at least one PAL channel because of incumbent user use, then, in block 220C, move, from each primary PAL channel utilized by a corresponding PAL user and for which the at least one indication indicated is being utilized or will be utilized by an incumbent user, the corresponding PAL user to a new PAL channel by circularly shifting higher or lower in frequency in the PAL frequency spectrum a corresponding primary PAL channel to an available PAL channel. Available PAL channel means a PAL channel (a) at least one of: (i) which is not licensed in a corresponding geographic region to a PAL user and (ii) in which a PAL user is licensed to use in the corresponding geographic region and in which a CBSD of the PAL user can be authorized to transmit in the PAL channel (e.g., by a SAS) but in which the CBSD is not authorized to transmit on the PAL channel, and (b) which the at least one indication did not indicate was being utilized or will be utilized by an incumbent user, where the incumbent user, or a dynamic protection area in which the incumbent user operates or would operate, has a neighborhood which geographically encompasses a geographic location of a PAL CBSD in the corresponding geographic region and operated by the PAL user. Circular shifting higher or lower in the PAL frequency spectrum means upon reaching respectively an upper edge or a lower edge of the PAL frequency spectrum, then continue shifting (i.e., respectively higher or lower in the PAL frequency spectrum) from the opposite (i.e., respectively lower or upper) edge. Upper edge means the highest frequency in the PAL frequency spectrum. Lower edge means the lowest frequency in the PAL frequency spectrum.

If the number of PAL users utilizing each PAL channel for which the at least one indication has been received is determined, then block 220C optionally further comprises (a) determining whether the number of primary PAL channels for which the at least one indication has been received is greater than one, and (b) if the number of primary PAL channels for which the at least one indication has been received is greater than one, then move each corresponding primary PAL channel in order of lowest to highest center frequency or highest to lowest center frequency of the corresponding primary PAL channel. Optionally, the available PAL channel is a first available PAL channel identified during circular shifting (without any other limitation). Optionally, the available PAL channel is a first available PAL channel identified during circular shifting and is not adjacent to a PAL channel used by another PAL user, wherein another PAL user in this context means a PAL user that is different than the PAL user using the corresponding primary PAL channel being shifted.

Optionally, in block 220D, each new PAL channel is transmitted to a corresponding PAL CBSD. Each corresponding PAL CBSD is operated by a corresponding PAL user. Upon the corresponding PAL CBSD receiving the new PAL channel, the corresponding PAL CBSD is configured to change its PAL channel, in which the PAL CBSD transits, to the received, new PAL channel. Optionally, each new PAL channel of a corresponding PAL CBSD is transmitted, from the SAS 102 which controls transmission of the corresponding PAL CBSD, to the other SAS(s) 106; this transmission could take place during CPAS or at another time. This information permits the other SAS(s) 106 to more accurately perform interference analysis for the protection of the new PAL channel that was relocated to the new PAL channel or any other incumbent protection.

Figure 3:
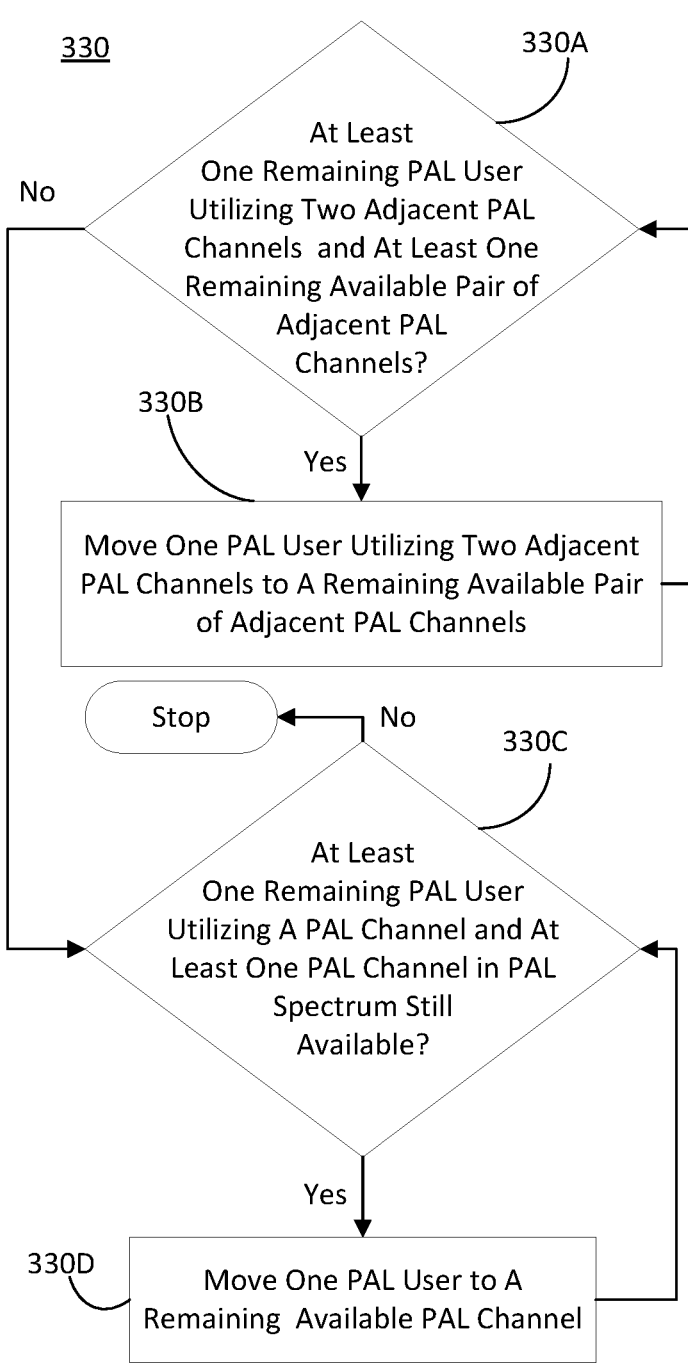
FIG. 3 illustrates a flow diagram of one embodiment of a method for moving, from each primary PAL channel utilized by a corresponding PAL user and for which the at least one indication indicated is being utilized or will be utilized by an incumbent user, the corresponding PAL user by circularly shifting higher or lower in frequency in the PAL frequency spectrum a corresponding primary PAL channel to an available PAL channel.

FIG. 3 illustrates a flow diagram of one embodiment of a method 330 for moving, from each primary PAL channel utilized by a corresponding PAL user and for which the at least one indication indicated is being utilized or will be utilized by an incumbent user, the corresponding PAL user by circularly shifting higher or lower in frequency in the PAL frequency spectrum a corresponding primary PAL channel to an available PAL channel. Method 330 is an optional technique for implementing block 220C.

In block 330A, whether there are (a) at least one remaining PAL user utilizing two adjacent PAL channels which the at least one indication indicates is being utilized or will be utilized by an incumbent user and (b) at least one remaining available pair of adjacent PAL channels in the PAL frequency spectrum are determined. Available adjacent PAL channels mean a first PAL channel and a second PAL channel, where a lowest frequency of the first PAL channel is adjacent to a highest frequency of the second PAL channel, and where each of the first and the second PAL channels is an available PAL channel; there is no intervening PAL channel between each of the adjacent PAL channels.

Upon determining that there are (a) at least one remaining PAL user utilizing two adjacent PAL channels which the at least one indication indicated is being utilized or will be utilized by an incumbent user and (b) at least one remaining available pair of adjacent PAL channels in the PAL frequency spectrum, then, in block 330B, one PAL user utilizing two adjacent PAL channels (which the at least one indication indicated is being utilized or will be utilized by an incumbent user) is moved, by circularly shifting higher or lower in frequency in the PAL frequency spectrum, from a corresponding primary pair of adjacent PAL channels to a remaining available pair of adjacent PAL channels in the PAL frequency spectrum. Block 330B is performed by circularly shifting higher or lower in frequency as discussed with respect to method 220. Available pair of adjacent PAL channels means a pair of PAL channel each of which is not utilized by a PAL user and are adjacent to one another, and which the at least one indication did not indicate was being utilized or will be utilized by the incumbent user, wherein the primary pair of adjacent PAL channels means adjacent PAL channels assigned to a PAL user and for which the at least one indication indicated was being utilized or will be utilized by the incumbent user. Upon completion of block 330B, then return to block 330A.

Upon determining that there is not (a) at least one remaining PAL user utilizing two adjacent PAL channels which the at least one indication indicated is being utilized or will be utilized by an incumbent user and (b) at least one remaining available pair of adjacent PAL channels in the PAL frequency spectrum, then, in block 330C, whether there is (a) at least one remaining PAL user utilizing a PAL channel which the at least one indication indicated is being utilized or will be utilized by an incumbent user and (b) at least one remaining available PAL channel in the PAL frequency spectrum are determined. Upon determining that there is (a) at least one remaining PAL user utilizing a PAL channel which the at least one indication indicated is being utilized or will be utilized by an incumbent user and (b) at least one remaining available PAL channel in the PAL frequency spectrum, then, in block 330D, one PAL user utilizing a PAL channel (which the at least one indication indicated is being utilized or will be utilized by an incumbent user) is moved, by circularly shifting higher or lower in frequency in the PAL frequency spectrum, from a corresponding primary PAL channel to a remaining available PAL channel in the PAL frequency spectrum. Upon completion of block 330D, then return to block 330C.

Each of blocks 330B and 330D are performed by circularly shifting higher or lower in frequency as discussed with respect to method 220. Optionally, for block 330B, the remaining available pair of adjacent PAL channels is a first remaining available pair of adjacent PAL channels identified during the circular shifting. Optionally, for block 330B, the remaining available pair of adjacent PAL channels is a first remaining available pair of adjacent PAL channels encountered during the circular shifting where the remaining available pair is not adjacent to a PAL channel used by another PAL user. Optionally, for block 330D, the remaining available PAL channel is a first remaining available PAL channel identified during circular shifting without any limitation. Optionally, the remaining available PAL channel is a first available PAL channel identified during circular shifting and is not adjacent to a PAL channel used by another PAL user.

The processor circuitry described herein may include one or more microprocessors, microcontrollers, digital signal processing (DSP) elements, application-specific integrated circuits (ASICs), and/or field programmable gate arrays (FPGAs). In this exemplary embodiment, processor circuitry includes or functions with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory circuitry described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods of the invention can be implemented in computer readable instructions, such as program modules or applications, which may be stored in the computer readable medium that is part of (optionally the memory circuitry) or communicatively coupled to the processing circuitry, and executed by the processing circuitry, optionally the processor circuitry. Generally, program modules or applications include routines, programs, objects, data components, data structures, algorithms, and the like, which perform particular tasks or implement particular abstract data types.

Databases as used herein may be either conventional databases or data storage formats of any type, e.g., data files. Although separate databases are recited herein, one or more of such databases may be combined.

Exemplary Embodiments

Example 1 includes a method is performed to determine a new Priority Access License (PAL) channel for a PAL radio configured to use a primary PAL channel, the method comprising: receiving at least one indication that an incumbent user is utilizing or will utilize at least one PAL channel in PAL frequency spectrum; determining whether at least one of the at least one PAL channel is utilized by at least one PAL radio which must vacate the at least one of the at least one PAL channel because of use by the incumbent user, wherein each PAL user operates at least one PAL radio; determining that the at least one of the at least one PAL channel is utilized by at least one PAL radio which must vacate the at least one of the at least one PAL channel because of the incumbent user use, then moving, from each primary PAL channel utilized by a corresponding PAL user and for which the at least one indication indicated is being utilized or will be utilized by the incumbent user, the corresponding PAL user to a new PAL channel by circularly shifting higher or lower in frequency in the PAL frequency spectrum a corresponding primary PAL channel to an available PAL channel, wherein the available PAL channel means a PAL channel (a) at least one of: (i) which is not licensed in a corresponding geographic region to a PAL user and (ii) in which the PAL user is licensed to use in the corresponding geographic region and in which a CBSD of the PAL user can be authorized to transmit in the PAL channel (e.g., by a SAS) but in which the CBSD is not authorized to transmit on the PAL channel, and (b) which the at least one indication did not indicate was being utilized or will be utilized by the incumbent user, where the incumbent user, or a dynamic protection area in which the incumbent user operates or would operate, has a neighborhood which geographically encompasses a geographic location of a PAL CBSD in the corresponding geographic region and operated by the PAL user, wherein the primary PAL channel means a PAL channel assigned to a PAL user for which the at least one indication indicated was being utilized or will be utilized by the incumbent user, and wherein circular shifting higher or lower in the PAL frequency spectrum means upon reaching an upper edge or a lower edge of the PAL frequency spectrum, then continue shifting from an opposite edge; and transmitting each new PAL channel to a corresponding PAL radio configured to change its PAL channel, in which the corresponding PAL radio transmits, to a corresponding new PAL channel.

Example 2 includes the method of Example 1, further comprising transmitting each new PAL channel from a spectrum access system (SAS) to at least one other spectrum access system.

Example 3 includes the method of any of Examples 1-2, wherein the at least one indication is received by a spectrum access system from at least one of an environmental sensing capability system communicatively and a database communicatively coupled.

Example 4 includes the method of any of Examples 1-3, wherein the method is performed by a spectrum access system (SAS) during coordinated periodic activities among SASes.

Example 5 includes the method of any of Examples 1-4, wherein determining whether the at least one of the at least one PAL channel is utilized further comprises determining a number of PAL users utilizing each PAL channel for which the at least one indication has been received; wherein then moving the corresponding PAL user to the new PAL channel by circularly shifting further comprises: determining whether the number of PAL users utilizing each PAL channel for which the at least one indication has been received is greater than one; and determining that the number of PAL users utilizing each PAL channel for which the at least one indication has been received is greater than one, then moving each corresponding PAL user in order of lowest to highest center frequency or highest to lowest center frequency of a corresponding primary PAL channel.

Example 6 includes the method of any of Examples 1-5, wherein the available PAL channel is a first available PAL channel identified during circular shifting.

Example 7 includes the method of any of Examples 1-6, wherein the available PAL channel is a first available PAL channel identified during circular shifting and is not adjacent to a PAL channel used by another PAL user which is different than the PAL user using a corresponding primary PAL channel being shifted.

Example 8 includes the method of any of Examples 1-7, wherein then moving the corresponding PAL user to the new PAL channel by circularly shifting further comprises: determining whether there are (a) at least one remaining PAL user utilizing two adjacent PAL channels which the at least one indication indicates is being utilized or will be utilized by the incumbent user and (b) at least one remaining available pair of adjacent PAL channels in the PAL frequency spectrum, wherein available adjacent PAL channels mean a first PAL channel and a second PAL channel, wherein a lowest frequency of the first PAL channel is adjacent to a highest frequency of the second PAL channel, and wherein each of the first PAL channel and the second PAL channel is an available PAL channel; determining that there are (a) at least one remaining PAL user utilizing two adjacent PAL channels which the at least one indication indicates is being utilized or will be utilized by the incumbent user and (b) at least one remaining available pair of adjacent PAL channels in the PAL frequency spectrum, then moving, by circularly shifting higher or lower in frequency in the PAL frequency spectrum, from a corresponding primary pair of adjacent PAL channels, for which the at least one indication indicated are being utilized or will be utilized by the incumbent user, to a remaining available pair of adjacent PAL channels in the PAL frequency spectrum, wherein an available pair of adjacent PAL channels means a pair of PAL channel each of which is not utilized by the PAL user and are adjacent to one another, and which the at least one indication did not indicate was being utilized or will be utilized by the incumbent user, and wherein an primary pair of adjacent PAL channels means adjacent PAL channels assigned to PAL user and for which the at least one indication indicated was being utilized or will be utilized by the incumbent user; determining that there are not (a) the at least one remaining PAL user utilizing two adjacent PAL channels which the at least one indication indicates is being utilized or will be utilized by the incumbent user and (b) the at least one remaining available pair of adjacent PAL channels in the PAL frequency spectrum, then determining whether there is (a) at least one remaining PAL user utilizing a PAL channel which the at least one indication indicated is being utilized or will be utilized by the incumbent user and (b) at least one remaining available PAL channel in the PAL frequency spectrum; and determining that there is (a) the at least one remaining PAL user utilizing the PAL channel which the at least one indication indicated is being utilized or will be utilized by the incumbent user and (b) the at least one remaining available PAL channel in the PAL frequency spectrum, then moving by circularly shifting one PAL user from a corresponding primary PAL channel, for which the at least one indication indicated is being utilized or will be utilized by the incumbent user, to a remaining available PAL channel in the PAL frequency spectrum.

Example 9 includes a non-transitory computer readable medium storing a program causing at least one processor of a spectrum access system (SAS) to execute a process to determine a new Priority Access License (PAL) channel for a PAL radio configured to use a primary PAL channel, the process comprising: receiving at least one indication that an incumbent user is utilizing or will utilize at least one PAL channel in PAL frequency spectrum; determining whether at least one of the at least one PAL channel is utilized by at least one PAL radio which must vacate the at least one of the at least one PAL channel because of use by the incumbent user, wherein each PAL user operates at least one PAL radio; determining that the at least one of the at least one PAL channel is utilized by at least one PAL radio which must vacate the at least one of the at least one PAL channel because of the incumbent user use, then moving, from each primary PAL channel utilized by a corresponding PAL user and for which the at least one indication indicated is being utilized or will be utilized by the incumbent user, the corresponding PAL user to a new PAL channel by circularly shifting higher or lower in frequency in the PAL frequency spectrum a corresponding primary PAL channel to an available PAL channel, wherein the available PAL channel means a PAL channel (a) at least one of: (i) which is not licensed in a corresponding geographic region to a PAL user and (ii) in which the PAL user is licensed to use in the corresponding geographic region and in which a CBSD of the PAL user can be authorized to transmit in the PAL channel (e.g., by a SAS) but in which the CBSD is not authorized to transmit on the PAL channel, and (b) which the at least one indication did not indicate was being utilized or will be utilized by the incumbent user, where the incumbent user, or a dynamic protection area in which the incumbent user operates or would operate, has a neighborhood which geographically encompasses a geographic location of a PAL CBSD in the corresponding geographic region and operated by the PAL user, wherein the primary PAL channel means a PAL channel assigned to a PAL user for which the at least one indication indicated was being utilized or will be utilized by the incumbent user, and wherein circular shifting higher or lower in the PAL frequency spectrum means upon reaching an upper edge or a lower edge of the PAL frequency spectrum, then continue shifting from an opposite edge; and transmitting each new PAL channel to a corresponding PAL radio configured to change its PAL channel, in which the corresponding PAL radio transmits, to a corresponding new PAL channel.

Example 10 includes the non-transitory computer readable medium of Example 9, wherein the process further comprises transmitting each new PAL channel from a spectrum access system (SAS) to at least one other spectrum access system.

Example 11 includes the non-transitory computer readable medium of any of Examples 9-10, wherein the at least one indication is received by a spectrum access system from at least one of an environmental sensing capability system communicatively and a database communicatively coupled.

Example 12 includes the non-transitory computer readable medium of any of Examples 9-11, wherein the process is performed by a spectrum access system (SAS) during coordinated periodic activities among SASes.

Example 13 includes the non-transitory computer readable medium of any of Examples 9-12, wherein determining whether the at least one of the at least one PAL channel is utilized further comprises determining a number of PAL users utilizing each PAL channel for which the at least one indication has been received; wherein then moving the corresponding PAL user to the new PAL channel by circularly shifting further comprises: determining whether the number of PAL users utilizing each PAL channel for which the at least one indication has been received is greater than one; and determining that the number of PAL users utilizing each PAL channel for which the at least one indication has been received is greater than one, then moving each corresponding PAL user in order of lowest to highest center frequency or highest to lowest center frequency of a corresponding primary PAL channel.

Example 14 includes the non-transitory computer readable medium of any of Examples 9-13, wherein the available PAL channel is a first available PAL channel identified during circular shifting.

Example 15 includes the non-transitory computer readable medium of any of Examples 9-14, wherein the available PAL channel is a first available PAL channel identified during circular shifting and is not adjacent to a PAL channel used by another PAL user which is different than the PAL user using a corresponding primary PAL channel being shifted.

Example 16 includes the non-transitory computer readable medium of any of Examples 9-15, wherein then moving the corresponding PAL user to the new PAL channel by circularly shifting further comprises: determining whether there are (a) at least one remaining PAL user utilizing two adjacent PAL channels which the at least one indication indicates is being utilized or will be utilized by the incumbent user and (b) at least one remaining available pair of adjacent PAL channels in the PAL frequency spectrum, wherein available adjacent PAL channels mean a first PAL channel and a second PAL channel, wherein a lowest frequency of the first PAL channel is adjacent to a highest frequency of the second PAL channel, and wherein each of the first PAL channel and the second PAL channel is an available PAL channel; determining that there are (a) at least one remaining PAL user utilizing two adjacent PAL channels which the at least one indication indicates is being utilized or will be utilized by the incumbent user and (b) at least one remaining available pair of adjacent PAL channels in the PAL frequency spectrum, then moving, by circularly shifting higher or lower in frequency in the PAL frequency spectrum, from a corresponding primary pair of adjacent PAL channels, for which the at least one indication indicated are being utilized or will be utilized by the incumbent user, to a remaining available pair of adjacent PAL channels in the PAL frequency spectrum, wherein an available pair of adjacent PAL channels means a pair of PAL channel each of which is not utilized by the PAL user and are adjacent to one another, and which the at least one indication did not indicate was being utilized or will be utilized by the incumbent user, and wherein an primary pair of adjacent PAL channels means adjacent PAL channels assigned to the PAL user and for which the at least one indication indicated was being utilized or will be utilized by the incumbent user; determining that there are not (a) the at least one remaining PAL user utilizing two adjacent PAL channels which the at least one indication indicates is being utilized or will be utilized by the incumbent user and (b) the at least one remaining available pair of adjacent PAL channels in the PAL frequency spectrum, then determining whether there is (a) at least one remaining PAL user utilizing a PAL channel which the at least one indication indicated is being utilized or will be utilized by the incumbent user and (b) at least one remaining available PAL channel in the PAL frequency spectrum; and determining that there is (a) the at least one remaining PAL user utilizing the PAL channel which the at least one indication indicated is being utilized or will be utilized by the incumbent user and (b) the at least one remaining available PAL channel in the PAL frequency spectrum, then moving by circularly shifting one PAL user from a corresponding primary PAL channel, for which the at least one indication indicated is being utilized or will be utilized by the incumbent user, to a remaining available PAL channel in the PAL frequency spectrum.

Example 17 includes a spectrum access system (SAS), configured to determine a new Priority Access License (PAL) channel for a PAL radio configured to use a primary PAL channel, comprising processing circuitry configured to: receive at least one indication that an incumbent user is utilizing or will utilize at least one PAL channel in PAL frequency spectrum; determine whether at least one of the at least one PAL channel is utilized by at least one PAL radio which must vacate the at least one of the at least one PAL channel because of use by the incumbent user, wherein each PAL user operates at least one PAL radio; determine that the at least one of the at least one PAL channel is utilized by at least one PAL radio which must vacate the at least one of the at least one PAL channel because of the incumbent user use, then move, from each primary PAL channel utilized by a corresponding PAL user and for which the at least one indication indicated is being utilized or will be utilized by the incumbent user, the corresponding PAL user to a new PAL channel by circularly shifting higher or lower in frequency in the PAL frequency spectrum a corresponding primary PAL channel to an available PAL channel, wherein the available PAL channel means a PAL channel (a) at least one of: (i) which is not licensed in a corresponding geographic region to a PAL user and (ii) in which the PAL user is licensed to use in the corresponding geographic region and in which a CBSD of the PAL user can be authorized to transmit in the PAL channel (e.g., by a SAS) but in which the CBSD is not authorized to transmit on the PAL channel, and (b) which the at least one indication did not indicate was being utilized or will be utilized by the incumbent user, where the incumbent user, or a dynamic protection area in which the incumbent user operates or would operate, has a neighborhood which geographically encompasses a geographic location of a PAL CBSD in the corresponding geographic region and operated by the PAL user, wherein the primary PAL channel means a PAL channel assigned to a PAL user for which the at least one indication indicated was being utilized or will be utilized by the incumbent user, and wherein circular shifting higher or lower in the PAL frequency spectrum means upon reaching an upper edge or a lower edge of the PAL frequency spectrum, then continue shifting from an opposite edge; and transmit each new PAL channel to a corresponding PAL radio configured to change its PAL channel, in which the corresponding PAL radio transmits, to a corresponding new PAL channel.

Example 18 includes the SAS of Example 17, wherein the processing circuitry is further configured to transmit each new PAL channel from a spectrum access system (SAS) to at least one other spectrum access system.

Example 19 includes the SAS of any of Examples 17-18, wherein the at least one indication is received by a spectrum access system from at least one of an environmental sensing capability system communicatively and a database communicatively coupled.

Example 20 includes the SAS of any of Examples 17-19, wherein determine whether the at least one of the at least one PAL channel is utilized further comprises determine a number of PAL users utilizing each PAL channel for which the at least one indication has been received; wherein then move the corresponding PAL user to the new PAL channel by circularly shifting further comprises: determine whether the number of PAL users utilizing each PAL channel for which the at least one indication has been received is greater than one; and determine that the number of PAL users utilizing each PAL channel for which the at least one indication has been received is greater than one, then move each corresponding PAL user in order of lowest to highest center frequency or highest to lowest center frequency of a corresponding primary PAL channel.

Example 21 includes the SAS of any of Examples 17-20, wherein the available PAL channel is a first available PAL channel identified during circular shifting.

Example 22 includes the SAS of any of Examples 17-21, wherein the available PAL channel is a first available PAL channel identified during circular shifting and is not adjacent to a PAL channel used by another PAL user which is different than the PAL user using a corresponding primary PAL channel being shifted.

Example 23 includes the SAS of any of Examples 17-22, wherein then move the corresponding PAL user to the new PAL channel by circularly shifting further comprises: determine whether there are (a) at least one remaining PAL user utilizing two adjacent PAL channels which the at least one indication indicates is being utilized or will be utilized by the incumbent user and (b) at least one remaining available pair of adjacent PAL channels in the PAL frequency spectrum, wherein available adjacent PAL channels mean a first PAL channel and a second PAL channel, wherein a lowest frequency of the first PAL channel is adjacent to a highest frequency of the second PAL channel, and wherein each of the first PAL channel and the second PAL channel is an available PAL channel; determine that there are (a) at least one remaining PAL user utilizing two adjacent PAL channels which the at least one indication indicates is being utilized or will be utilized by the incumbent user and (b) at least one remaining available pair of adjacent PAL channels in the PAL frequency spectrum, then move, by circularly shifting higher or lower in frequency in the PAL frequency spectrum, from a corresponding primary pair of adjacent PAL channels, for which the at least one indication indicated are being utilized or will be utilized by the incumbent user, to a remaining available pair of adjacent PAL channels in the PAL frequency spectrum, wherein an available pair of adjacent PAL channels means a pair of PAL channel each of which is not utilized by the PAL user and are adjacent to one another, and which the at least one indication did not indicate was being utilized or will be utilized by the incumbent user, and wherein an primary pair of adjacent PAL channels means adjacent PAL channels assigned to the PAL user and for which the at least one indication indicated was being utilized or will be utilized by the incumbent user; determine that there are not (a) the at least one remaining PAL user utilizing two adjacent PAL channels which the at least one indication indicates is being utilized or will be utilized by the incumbent user and (b) the at least one remaining available pair of adjacent PAL channels in the PAL frequency spectrum, then determining whether there is (a) at least one remaining PAL user utilizing a PAL channel which the at least one indication indicated is being utilized or will be utilized by the incumbent user and (b) at least one remaining available PAL channel in the PAL frequency spectrum; and determine that there is (a) the at least one remaining PAL user utilizing the PAL channel which the at least one indication indicated is being utilized or will be utilized by the incumbent user and (b) the at least one remaining available PAL channel in the PAL frequency spectrum, then moving by circularly shifting one PAL user from a corresponding primary PAL channel, for which the at least one indication indicated is being utilized or will be utilized by the incumbent user, to a remaining available PAL channel in the PAL frequency spectrum.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:

1. A method is performed to determine a new Priority Access License (PAL) channel for a PAL radio configured to use a primary PAL channel, the method comprising:

receiving an indication that an incumbent user is utilizing or will utilize at least one PAL channel in PAL frequency spectrum;

determining whether some of the at least one PAL channel are utilized by the PAL radio and must be vacated by the PAL radio because of use by the incumbent user;

determining that the some of the at least one PAL channel are utilized by the PAL radio and must be vacated because of the incumbent user use, then:

determining whether there are (a) a PAL user utilizing two adjacent PAL channels which the indication indicates are being utilized or will be utilized by the incumbent user and (b) a remaining available pair of adjacent PAL channels in the PAL frequency spectrum;

determining that there are (a) the PAL user utilizing the two adjacent PAL channels which the indication indicates are being utilized or will be utilized by the incumbent user and (b) the remaining available pair of adjacent PAL channels in the PAL frequency spectrum, then moving, by circularly shifting higher or lower in frequency in the PAL frequency spectrum, from a corresponding primary pair of adjacent PAL channels, for which the indication indicated are being utilized or will be utilized by the incumbent user, to a remaining available pair of adjacent PAL channels in the PAL frequency spectrum;

determining that there are not (a) the PAL user utilizing two adjacent PAL channels which the indication indicates is being utilized or will be utilized by the incumbent user and (b) the remaining available pair of adjacent PAL channels in the PAL frequency spectrum, then determining whether there is (a) a PAL user utilizing a PAL channel which the indication indicated is being utilized or will be utilized by the incumbent user and (b) a remaining available PAL channel in the PAL frequency spectrum; and determining that there is (a) the PAL user utilizing the PAL channel which the indication indicated is being utilized or will be utilized by the incumbent user and (b) the remaining available PAL channel in the PAL frequency spectrum, then moving by circularly shifting one PAL user from a corresponding primary PAL channel, for which the indication indicated is being utilized or will be utilized by the incumbent user, to the remaining available PAL channel in the PAL frequency spectrum; and transmitting each new PAL channel to a corresponding PAL radio configured to change its PAL channel, in which the corresponding PAL radio transmits, to a corresponding new PAL channel;

wherein each PAL user operates a set of one or more PAL radios;

wherein available pair of adjacent PAL channels means a first PAL channel and a second PAL channel, wherein a lowest frequency of the first PAL channel is adjacent to a highest frequency of the second PAL channel, and wherein each of the first PAL channel and the second PAL channel is an available PAL channel;

wherein a primary pair of adjacent PAL channels means adjacent PAL channels assigned to the PAL user and for which the indication indicated was being utilized or will be utilized by the incumbent user;

wherein the available PAL channel means a PAL channel (a) (i) which is not licensed in a corresponding geographic region to a PAL user and/or (ii) in which the PAL user is licensed to use in the corresponding geographic region and in which a citizens broadband radio service device (CBSD) of the PAL user can be authorized to transmit in the PAL channel but in which the CBSD is not authorized to transmit on the PAL channel, and (b) which the indication did not indicate was being utilized or will be utilized by the incumbent user, where the incumbent user, or a dynamic protection area in which the incumbent user operates or would operate, has a neighborhood which geographically encompasses a geographic location of a PAL CBSD in the corresponding geographic region and operated by the PAL user;

wherein the primary PAL channel means a PAL channel assigned to the PAL user for which the indication indicated was being utilized or will be utilized by the incumbent user;

wherein circular shifting higher or lower in the PAL frequency spectrum means upon reaching an upper edge or a lower edge of the PAL frequency spectrum, then continue shifting from an opposite edge.

2. The method of claim 1, further comprising transmitting each new PAL channel from a spectrum access system to at least one other spectrum access system.

3. The method of claim 1, wherein the indication is received by a spectrum access system from at least one of an environmental sensing capability system communicatively and a database communicatively coupled.

4. The method of claim 1, wherein the method is performed by a spectrum access system (SAS) during coordinated periodic activities among SASes.

5. The method of claim 1, wherein determining whether the some of the at least one PAL channel is utilized further comprises determining a number of PAL users utilizing each PAL channel for which the indication has been received;

wherein then moving the corresponding PAL user to the new PAL channel by circularly shifting further comprises:

determining whether the number of PAL users utilizing each PAL channel for which the indication has been received is greater than one; and determining that the number of PAL users utilizing each PAL channel for which the indication has been received is greater than one, then moving each corresponding PAL user in order of lowest to highest center frequency or highest to lowest center frequency of the corresponding primary PAL channel.

6. The method of claim 1, wherein the available PAL channel is a first available PAL channel identified during circular shifting.

7. The method of claim 1, wherein the available PAL channel is a first available PAL channel identified during circular shifting and is not adjacent to a PAL channel used by another PAL user which is different than the PAL user using the corresponding primary PAL channel being shifted.

8. A non-transitory computer readable medium storing a program causing at least one processor of a spectrum access system (SAS) to execute a process to determine a new Priority Access License (PAL) channel for a PAL radio configured to use a primary PAL channel, the process comprising:

receiving an indication that an incumbent user is utilizing or will utilize at least one PAL channel in PAL frequency spectrum;

determining whether some of the at least one PAL channel are utilized by the PAL radio and must be vacated by the PAL radio because of use by the incumbent user;

determining that the some of the at least one PAL channel are utilized by the PAL radio and must be vacated because of the incumbent user use, then:

determining whether there are (a) a PAL user utilizing two adjacent PAL channels which the indication indicates are being utilized or will be utilized by the incumbent user and (b) a remaining available pair of adjacent PAL channels in the PAL frequency spectrum;

determining that there are (a) the PAL user utilizing the two adjacent PAL channels which the indication indicates are being utilized or will be utilized by the incumbent user and (b) the remaining available pair of adjacent PAL channels in the PAL frequency spectrum, then moving, by circularly shifting higher or lower in frequency in the PAL frequency spectrum, from a corresponding primary pair of adjacent PAL channels, for which the indication indicated are being utilized or will be utilized by the incumbent user, to a remaining available pair of adjacent PAL channels in the PAL frequency spectrum;

determining that there are not (a) the PAL user utilizing two adjacent PAL channels which the indication indicates is being utilized or will be utilized by the incumbent user and (b) the remaining available pair of adjacent PAL channels in the PAL frequency spectrum, then determining whether there is (a) a PAL user utilizing a PAL channel which the indication indicated is being utilized or will be utilized by the incumbent user and (b) a remaining available PAL channel in the PAL frequency spectrum; and determining that there is (a) the PAL user utilizing the PAL channel which the indication indicated is being utilized or will be utilized by the incumbent user and (b) the remaining available PAL channel in the PAL frequency spectrum, then moving by circularly shifting one PAL user from a corresponding primary PAL channel, for which the indication indicated is being utilized or will be utilized by the incumbent user, to the remaining available PAL channel in the PAL frequency spectrum; and cause transmission of each new PAL channel to a corresponding PAL radio configured to change its PAL channel, in which the corresponding PAL radio transmits, to a corresponding new PAL channel;

wherein each PAL user operates a set of one or more PAL radios;

wherein available pair of adjacent PAL channels means a first PAL channel and a second PAL channel, wherein a lowest frequency of the first PAL channel is adjacent to a highest frequency of the second PAL channel, and wherein each of the first PAL channel and the second PAL channel is an available PAL channel;

wherein a primary pair of adjacent PAL channels means adjacent PAL channels assigned to the PAL user and for which the indication indicated was being utilized or will be utilized by the incumbent user;

wherein the available PAL channel means a PAL channel (a) (i) which is not licensed in a corresponding geographic region to a PAL user and/or (ii) in which the PAL user is licensed to use in the corresponding geographic region and in which a citizens broadband radio service device (CBSD) of the PAL user can be authorized to transmit in the PAL channel but in which the CBSD is not authorized to transmit on the PAL channel, and (b) which the indication did not indicate was being utilized or will be utilized by the incumbent user, where the incumbent user, or a dynamic protection area in which the incumbent user operates or would operate, has a neighborhood which geographically encompasses a geographic location of a PAL CBSD in the corresponding geographic region and operated by the PAL user;

wherein the primary PAL channel means a PAL channel assigned to the PAL user for which the indication indicated was being utilized or will be utilized by the incumbent user;

wherein circular shifting higher or lower in the PAL frequency spectrum means upon reaching an upper edge or a lower edge of the PAL frequency spectrum, then continue shifting from an opposite edge.

9. The non-transitory computer readable medium of claim 8, further comprising causing transmission of each new PAL channel from the spectrum access system to at least one other spectrum access system.

10. The non-transitory computer readable medium of claim 8, wherein the indication is received by the spectrum access system from at least one of an environmental sensing capability system communicatively and a database communicatively coupled.

11. The non-transitory computer readable medium of claim 8, wherein the process is performed by the spectrum access system during coordinated periodic activities among SASes.

12. The non-transitory computer readable medium of claim 8, wherein determining whether the some of the at least one PAL channel is utilized further comprises determining a number of PAL users utilizing each PAL channel for which the indication has been received;

wherein then moving the corresponding PAL user to the new PAL channel by circularly shifting further comprises:

determining whether the number of PAL users utilizing each PAL channel for which the indication has been received is greater than one; and determining that the number of PAL users utilizing each PAL channel for which the indication has been received is greater than one, then moving each corresponding PAL user in order of lowest to highest center frequency or highest to lowest center frequency of the corresponding primary PAL channel.

13. The non-transitory computer readable medium of claim 8, wherein the available PAL channel is a first available PAL channel identified during circular shifting.

14. The non-transitory computer readable medium of claim 8, wherein the available PAL channel is a first available PAL channel identified during circular shifting and is not adjacent to a PAL channel used by another PAL user which is different than the PAL user using the corresponding primary PAL channel being shifted.

15. A spectrum access system (SAS), configured to determine a new Priority Access License (PAL) channel for a PAL radio configured to use a primary PAL channel, the SAS comprising: processing circuitry comprising processor circuitry coupled to memory circuitry and configured to:

receive an indication that an incumbent user is utilizing or will utilize at least one PAL channel in PAL frequency spectrum;

determine whether some of the at least one PAL channel are utilized by the PAL radio and must be vacated by the PAL radio because of use by the incumbent user;

determine that some of the at least one PAL channel are utilized by the PAL radio and must be vacated because of the incumbent user use, then:

determine whether there are (a) a PAL user utilizing two adjacent PAL channels which the indication indicates are being utilized or will be utilized by the incumbent user and (b) a remaining available pair of adjacent PAL channels in the PAL frequency spectrum;

determining that there are (a) the PAL user utilizing the two adjacent PAL channels which the indication indicates are being utilized or will be utilized by the incumbent user and (b) the remaining available pair of adjacent PAL channels in the PAL frequency spectrum, then move, by circularly shifting higher or lower in frequency in the PAL frequency spectrum, from a corresponding primary pair of adjacent PAL channels, for which the indication indicated are being utilized or will be utilized by the incumbent user, to a remaining available pair of adjacent PAL channels in the PAL frequency spectrum;

determining that there are not (a) the PAL user utilizing two adjacent PAL channels which the indication indicates is being utilized or will be utilized by the incumbent user and (b) the remaining available pair of adjacent PAL channels in the PAL frequency spectrum, then determine whether there is (a) a PAL user utilizing a PAL channel which the indication indicated is being utilized or will be utilized by the incumbent user and (b) a remaining available PAL channel in the PAL frequency spectrum; and determining that there is (a) the PAL user utilizing the PAL channel which the indication indicated is being utilized or will be utilized by the incumbent user and (b) the remaining available PAL channel in the PAL frequency spectrum, then move by circularly shifting one PAL user from a corresponding primary PAL channel, for which the indication indicated is being utilized or will be utilized by the incumbent user, to the remaining available PAL channel in the PAL frequency spectrum; and cause transmission of each new PAL channel to a corresponding PAL radio configured to change its PAL channel, in which the corresponding PAL radio transmits, to a corresponding new PAL channel;

wherein each PAL user operates a set of one or more PAL radios;

wherein available pair of adjacent PAL channels means a first PAL channel and a second PAL channel, wherein a lowest frequency of the first PAL channel is adjacent to a highest frequency of the second PAL channel, and wherein each of the first PAL channel and the second PAL channel is an available PAL channel;

wherein a primary pair of adjacent PAL channels means adjacent PAL channels assigned to the PAL user and for which the indication indicated was being utilized or will be utilized by the incumbent user;

wherein the available PAL channel means a PAL channel (a) (i) which is not licensed in a corresponding geographic region to a PAL user and/or (ii) in which the PAL user is licensed to use in the corresponding geographic region and in which a citizens broadband radio service device (CBSD) of the PAL user can be authorized to transmit in the PAL channel but in which the CBSD is not authorized to transmit on the PAL channel, and (b) which the indication did not indicate was being utilized or will be utilized by the incumbent user, where the incumbent user, or a dynamic protection area in which the incumbent user operates or would operate, has a neighborhood which geographically encompasses a geographic location of a PAL CBSD in the corresponding geographic region and operated by the PAL user;

wherein the primary PAL channel means a PAL channel assigned to the PAL user for which the indication indicated was being utilized or will be utilized by the incumbent user;

wherein circular shifting higher or lower in the PAL frequency spectrum means upon reaching an upper edge or a lower edge of the PAL frequency spectrum, then continue shifting from an opposite edge.

16. The SAS of claim 15, further comprising causing transmission of each new PAL channel from the spectrum access system to at least one other spectrum access system.

17. The SAS of claim 15, wherein the indication is received by the spectrum access system from at least one of an environmental sensing capability system communicatively and a database communicatively coupled.

18. The SAS of claim 15, wherein determine whether the some of the at least one PAL channel are utilized by a PAL radio and must be vacated by the PAL radio because of use by the incumbent user is performed during coordinated periodic activities among SASes.

19. The SAS of claim 15, wherein determine whether the some of the at least one PAL channel is utilized further comprises determining a number of PAL users utilizing each PAL channel for which the indication has been received;

wherein then moving the corresponding PAL user to the new PAL channel by circularly shifting further comprises:

determining whether the number of PAL users utilizing each PAL channel for which the indication has been received is greater than one; and determining that the number of PAL users utilizing each PAL channel for which the indication has been received is greater than one, then moving each corresponding PAL user in order of lowest to highest center frequency or highest to lowest center frequency of the corresponding primary PAL channel.

20. The SAS of claim 15, wherein the available PAL channel is a first available PAL channel identified during circular shifting.

21. The SAS of claim 15, wherein the available PAL channel is a first available PAL channel identified during circular shifting and is not adjacent to a PAL channel used by another PAL user which is different than the PAL user using the corresponding primary PAL channel being shifted.

\* \* \* \* \*